United States Patent
Hall et al.

(10) Patent No.: US 11,008,887 B2
(45) Date of Patent: May 18, 2021

(54) FAN CONTAINMENT ASSEMBLY HAVING A NESTING CAVITY

(71) Applicant: Rolls-Royce Corporation, Indianapolis, IN (US)

(72) Inventors: Christopher Hall, Indianapolis, IN (US); Matthew Kappes, Greenwood, IN (US); Glenn Patterson, Indianapolis, IN (US); Robert Heeter, Noblesville, IN (US)

(73) Assignee: ROLLS-ROYCE CORPORATION, Indianapolis, IN (US)

( * ) Notice: Subject to any disclaimer, the term of this patent is extended or adjusted under 35 U.S.C. 154(b) by 123 days.

(21) Appl. No.: 16/229,615

(22) Filed: Dec. 21, 2018

(65) Prior Publication Data
US 2020/0200038 A1  Jun. 25, 2020

(51) Int. Cl.
*F01D 21/04* (2006.01)
*F01D 25/24* (2006.01)
*F01D 25/26* (2006.01)

(52) U.S. Cl.
CPC ......... *F01D 21/045* (2013.01); *F01D 25/243* (2013.01); *F01D 25/26* (2013.01); *F05D 2240/14* (2013.01); *F05D 2250/283* (2013.01); *F05D 2300/603* (2013.01)

(58) Field of Classification Search
CPC .... F01D 11/127; F01D 11/125; F01D 11/122; F01D 21/04; F01D 21/045; F01D 25/243; F01D 25/26; F04D 29/4253; F04D 29/526; F05D 2240/14; F05D 2250/283; F05D 2300/603

See application file for complete search history.

(56) References Cited

U.S. PATENT DOCUMENTS

| | | | | |
|---|---|---|---|---|
| 4,475,864 A * | 10/1984 | Patacca | ................ | F01D 21/045 415/9 |
| 4,534,698 A * | 8/1985 | Tomich | ................ | F01D 21/045 415/121.2 |
| 4,648,795 A | 3/1987 | Lardellier | | |
| 5,388,959 A * | 2/1995 | Forrester | ............... | F01D 11/122 415/173.4 |
| 5,482,429 A | 1/1996 | Penda | | |
| 5,486,086 A * | 1/1996 | Bellia | ................ | F01D 21/045 415/9 |
| 6,206,631 B1 * | 3/2001 | Schilling | ............... | F01D 21/045 415/9 |
| 7,445,421 B2 | 11/2008 | Sathianathan | | |
| 9,677,570 B2 * | 6/2017 | Care | .................... | F01D 21/045 |
| 9,683,490 B2 * | 6/2017 | Harper | ................. | F01D 11/122 |

(Continued)

*Primary Examiner* — Courtney D Heinle
*Assistant Examiner* — Andrew Thanh Bui
(74) *Attorney, Agent, or Firm* — Brinks Gilson & Lione

(57) ABSTRACT

A containment assembly is disclosed for a turbofan engine. The containment assembly comprises a forward fence, an aft fence, a fan track liner, an intermediate casing member, an outer casing member, and an annular nesting cavity. The fan track liner is disposed axially between the forward and aft fences. The intermediate casing member is disposed radially outward of at least a portion of the fan track liner. The outer casing member is disposed radially outward of at least a portion of the intermediate member. The annular nesting cavity is bounded at least in part by the intermediate casing member and the outer casing member.

20 Claims, 7 Drawing Sheets

(56) References Cited

U.S. PATENT DOCUMENTS

| | | | |
|---|---|---|---|
| 9,702,375 B2 * | 7/2017 | Costa | F01D 11/18 |
| 9,714,583 B2 | 7/2017 | Watson | |
| 10,294,794 B2 * | 5/2019 | Reed | F01D 5/06 |
| 2015/0267556 A1 * | 9/2015 | Thomas | F01D 21/045 415/9 |
| 2016/0097300 A1 | 4/2016 | Evans | |
| 2018/0230855 A1 | 8/2018 | Heeter | |

\* cited by examiner

FAN CONTAINMENT ASSEMBLY HAVING A NESTING CAVITY

BACKGROUND

Gas turbine engines used in civil aviation require the ability to contain a fan blade during a Fan Blade Off (FBO) event. During a FBO event, significant damage is typically expected to the engine. By certification regulation, no high energy debris—such as the detached fan blade—may be permitted to exit from the front or side of the engine casing. Designing a gas turbine engine to meet the FBO containment requirement is challenging, as debris from the FBO event tends to flow downstream and interact with downstream engine components, causing further damage that is difficult to predict and model. Downstream damage may cause unbalanced loads in the engine, severely impacting engine performance and the ability to control the aircraft. Downstream damage could also potentially cause compromised structures which may not survive windmill loading during the time it takes to land after a FBO event.

Gas turbine engines currently rely on reinforced casings and mounting structures proximate the fan to withstand the damage expected from a FBO event and meet aviation authority regulations. However, these casings and structures add substantial weight to the engine, resulting in reduced aircraft range and/or fuel efficiency.

SUMMARY

According to some aspects of the present disclosure, a containment assembly for a turbofan engine comprises a forward fence, an aft fence axially spaced from the forward fence, a fan track liner, an intermediate casing member, an outer casing, and an annular nesting cavity. The fan track liner is disposed axially between the forward and aft fences. The intermediate casing member is disposed radially outward of at least a portion of the fan track liner. The outer casing member is disposed radially outward of at least a portion of the intermediate casing member. The annular nesting cavity is bounded at least in part by the intermediate casing member and the outer casing member.

In some embodiments the containment assembly further comprises a nesting member disposed in the nesting cavity. In some embodiments the nesting member comprises a honeycomb material. In some embodiments the intermediate casing member comprises composite. In some embodiments the intermediate casing member is coupled to the outer casing member. In some embodiments the fan track liner comprises an annular attrition liner. In some embodiments the outer casing member defines a forward fence and the nesting cavity extends axially forward and axially aft of said forward fence.

According to further aspects of the present disclosure, a containment assembly is disclosed for a machine having a bladed rotor defining an axis of rotation. The bladed rotor is radially bound at least in part by the containment assembly. The containment assembly comprises a casing, an annular liner, and an annular blade. The casing defines a forward fence positioned axially forward of the bladed rotor and an aft fence positioned axially aft of the bladed rotor. The annular liner is disposed radially outward of the bladed rotor and extends between the forward fence and the aft fence. The annular blade nesting cavity is defined at least in part by the casing and positioned radially outward of at least a portion of the annular liner. The nesting cavity extends axially forward and axially aft of the aft fence.

In some embodiments the containment assembly further comprises an intermediate casing member disposed between the casing and the liner. In some embodiments the intermediate casing member is coupled to the casing. In some embodiments the intermediate casing member is bolted to the casing, having a bolt axially positioned between a leading edge and a trailing edge of a blade of the bladed rotor. In some embodiments at least a portion of the liner or the nesting cavity is cylindrical. In some embodiments a radially outermost point of the nesting cavity is radially outward of a radially outermost point of the liner. In some embodiments the forward fence comprises a hook.

According to additional aspects of the present disclosure, a containment assembly is presented for a machine having a plurality of blades affixed to a rotor, each blade having a leading edge, trailing edge, and blade tip. The rotor defines an axis of rotation of the machine and is radially bounded at least in part by the containment assembly. The containment assembly comprises a fan track liner, an intermediate casing, an outer casing member, and an annular nesting cavity. The fan track liner forms a radially inner member of the assembly. The intermediate casing member is disposed radially outward of the fan track liner. The outer casing member is disposed radially outward and radially offset from the intermediate casing member. The annular nesting cavity is disposed between and at least partly defined by the outer casing member and the intermediate casing member. Each of the fan track liner, intermediate casing member, and nesting cavity extend axially forward of the leading edge of a blade and axially aft of the trailing edge of a blade.

In some embodiments the containment assembly further comprises a nesting member disposed in the nesting cavity. In some embodiments the nesting member comprises a honeycomb material. In some embodiments the intermediate casing member comprises composite.

In some embodiments the casing defines a forward fence positioned axially forward of the leading edge of a blade and an aft fence positioned axially aft of the trailing edge of a blade. In some embodiments each of the fan track liner, intermediate casing member, and nesting cavity extend between the forward fence and the aft fence. In some embodiments the forward fence comprises a hook.

BRIEF DESCRIPTION OF THE DRAWINGS

The following will be apparent from elements of the figures, which are provided for illustrative purposes.

Figure 1:
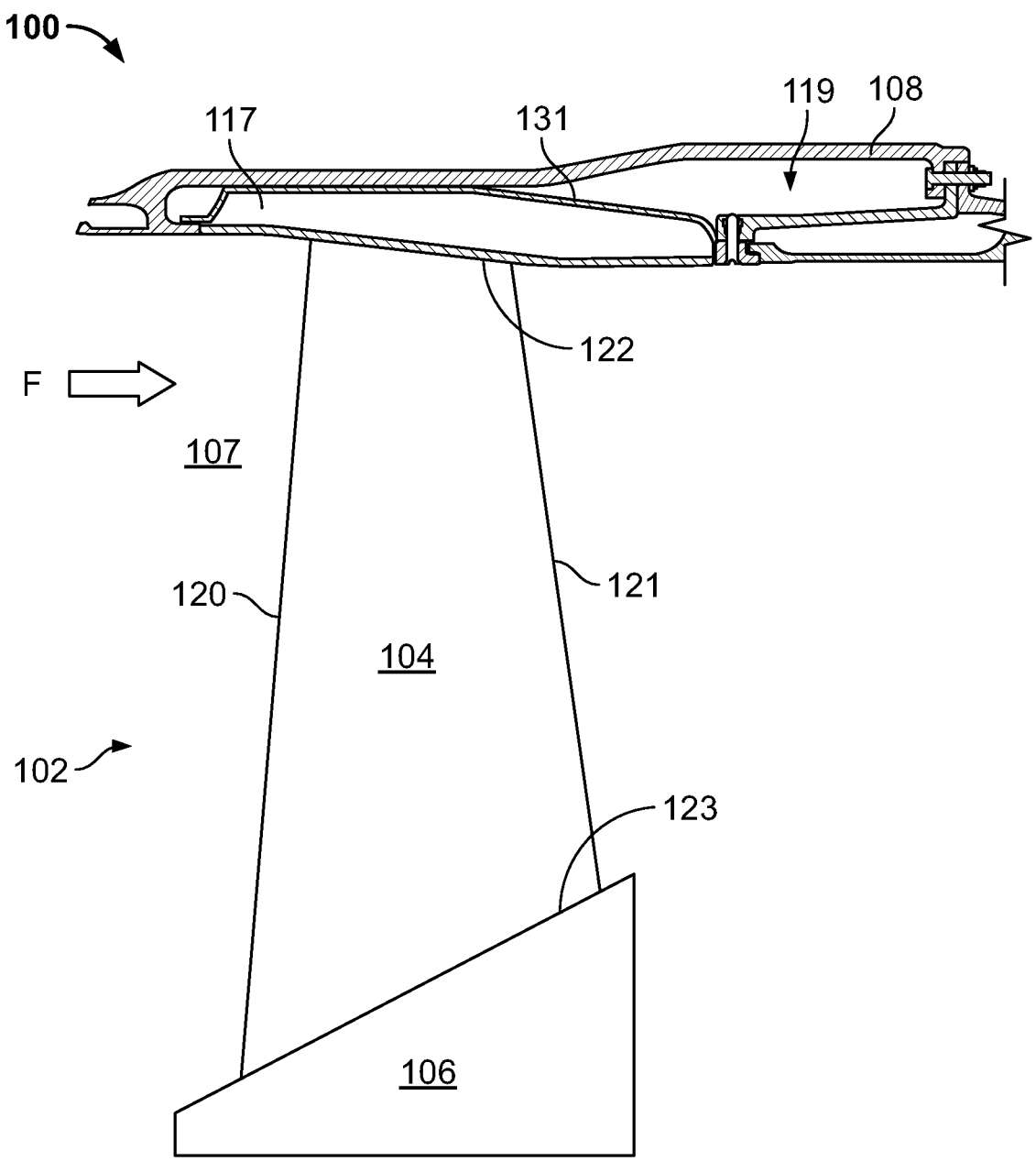
FIG. 1 is an axial cutaway view of a fan and containment assembly of a gas turbine engine in accordance with some embodiments of the present disclosure.

The present application discloses illustrative (i.e., example) embodiments. The claimed inventions are not limited to the illustrative embodiments. Therefore, many implementations of the claims will be different than the illustrative embodiments. Various modifications can be made to the claimed inventions without departing from the spirit and scope of the disclosure. The claims are intended to cover implementations with such modifications.

DETAILED DESCRIPTION

For the purposes of promoting an understanding of the principles of the disclosure, reference will now be made to a number of illustrative embodiments in the drawings and specific language will be used to describe the same.

The present disclosure is directed to systems and methods of fan containment that overcome the aforementioned problems in the art, namely the use of reinforced casings and mounting structures that add substantial weight to the engine in order to withstand a FBO event, resulting in reduced aircraft range. Some fan containment assemblies rely on a hook-shaped forward containment fence and the aft motion of non-detached blades to 'sweep' a detached blade during an FBO event axially aft (downstream). Downstream components are likely to suffer substantial damage as the detached blade and other debris pass downstream and contact additional fans, guide vanes, rotors, bearing housings, flowpath boundary members, and the like. It is therefore desirable to develop a fan containment assembly that maintains the ability to prevent forward and radial ejection of the detached fan blade and high energy debris while minimizing damage to downstream components.

Previous efforts to reduce the weight of a fan containment assembly required to meet FBO requirements have focused on the use of a softwall containment system that removes the blade from the flowpath. However, softwall containments require a large 'keep out zone' radially outward from the fan, thus resulting in a larger radial dimension of the nacelle and a larger drag force on the aircraft.

The present disclosure is therefore directed to a containment assembly for a turbofan engine having a nesting cavity radially outward of the fan. In some embodiments, the nesting cavity is both radially outward and downstream (i.e. rearward) of the fan. The nesting cavity completely or partially removes the detached blade of an FBO event from the engine core and bypass flowpath. The presently disclosed containment assembly has a reduced weight as compared to previous containment assemblies while minimizing any drag penalty such as those incurred by a softwall containment assembly.

Figure 2:
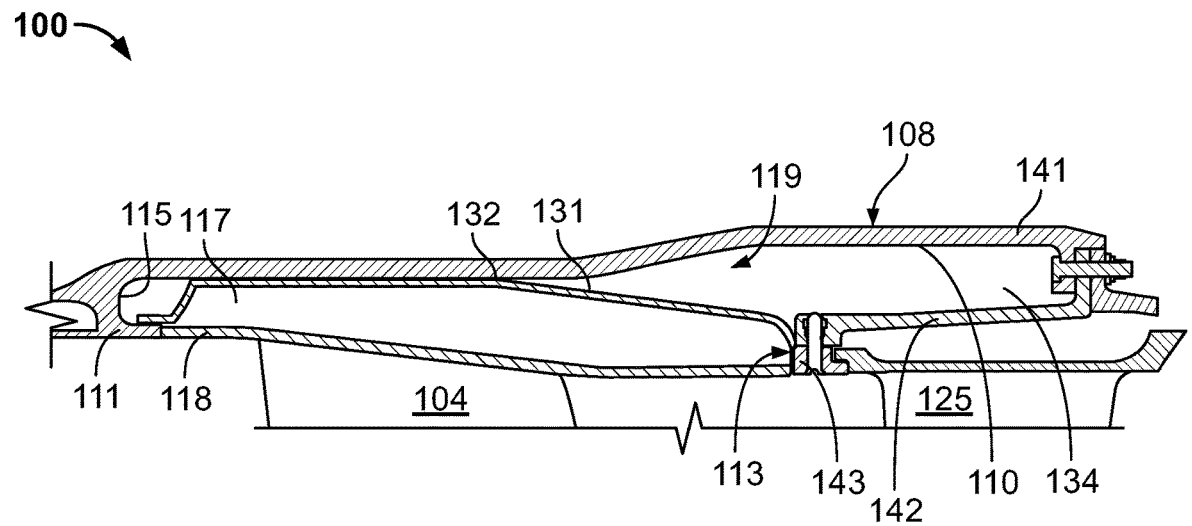
FIG. 2 is an axial cutaway view of the fan and containment assembly of FIG. 1 in accordance with some embodiments of the present disclosure.

An embodiment of the presently disclosed containment assembly 100 is presented at FIGS. 1 and 2. Each of FIGS. 1 and 2 provide an axial cutaway view of a portion of a gas turbine engine having a fan 102 and containment assembly 100. The fan 102 comprises a bladed rotor that defines an axis of rotation. The fan 102 comprises a plurality of blades 104 coupled to a rotor 106. Each blade 104 comprises a leading edge 120, trailing edge 121, blade tip 122, and blade root 123. The rotor 106 may be coupled to and/or driven by a shaft of the engine. The fan 102 is radially bound at least in part by the containment assembly 100.

A gas flowpath 107 is defined between the containment assembly 100 and rotor 106. Arrow F indicates the direction of bulk flow into and through the gas flowpath 107. Downstream of fan 102 the gas flowpath 107 may divide into additional flowpaths, such as a core flowpath and a bypass flowpath (not shown).

The containment assembly 100 comprises an outer casing 108, an annular liner 117, and an annular blade nesting cavity 119.

The outer casing 108 may be formed as a unitary member or may comprise a number of members. In the illustrated embodiment, the outer casing 108 comprises an outer casing member 141, an inner member 142, and a retention ring 143. The outer casing 108 has a radially inner surface 110 that faces the fan 102. The outer casing 108 may define a forward fence 111 positioned axially forward of blade 104 and an aft fence 113 positioned axially aft of blade 104. The aft fence 113 is axially spaced from the forward fence 111. The forward fence 111 may comprise a hook 115 or a radially extending surface. The hook 115 may prevent ejection of a detached blade 104 in an axially forward direction. The aft fence 113 may comprise a radially extending surface, and may be formed in part by surfaces of the inner member 142 and retention ring 143. The casing may comprise a metal (e.g., aluminum, titanium, steel), and/or composite, and all combinations and varieties thereof.

The annular liner 117 is disposed radially outward of the fan 102 and may extend between and/or be disposed axially between the forward fence 111 and aft fence 113. The liner 117 may be a fan track liner, and may comprise an attrition liner 118. The attrition liner 118 may form a radially inward, fan-facing surface. The attrition liner 118 may comprise an abradable material. The attrition liner 118 may be designed to be abraded away by the blade tips 122 during abnormal operational movements of the plurality of blades 104. During normal operations, the blade tips 122 typically do not contact the attrition liner 118. The attrition liner 118 may partly define the gas flowpath 107. The attrition liner 118 may also be the radially inner member of the containment assembly 100.

The annular liner 117 may comprise a solid or honeycomb structure. The annular liner 117 may comprise one or more of nomex, metal, foam, and/or aerogel. The annular liner 117 may comprise layers of composite laminates such as but not limited to carbon or glass fiber as well as film adhesives. The annular liner 117 may comprise one or more circumferential sections or cassettes for ease of installation and removal. The strength of the annular liner 117 may tend to conflict with the overall intent of the casing function in that it is desirable the liner 117 be most frangible such that the blade fragment is positioned most readily. However, the liner 117 is subject to other factors requiring it be less frangible (eg. ice impact, dynamics, etc.). The annular liner 117 and the casing 108 are designed to be compatible.

A nesting cavity 119 is defined at least in part by the outer casing 108. The nesting cavity 119 may be positioned radially outward or at least a portion of the annular liner 117. In some embodiments, the nesting cavity 119 may axially overlap with a portion of the blade 104. The nesting cavity 119 may extend axially forward and axially aft of the aft fence 113.

In some embodiments a mouth of the nesting cavity 119 is defined between the aft fence 113 and the outer casing 108. In some embodiments the axially forwardmost point of the mouth of the nesting cavity 119 may be positioned axially forward of the trailing edge 121. In other embodiments, the axially forwardmost point of the mouth of the nesting cavity 119 may be positioned axially aft of the trailing edge 121, or may be axially aligned with the trailing edge 121.

In some embodiments the nesting cavity 119 may be a continuous (i.e. unbroken) annulus. In other embodiments the nesting cavity 119 may be circumferentially segmented, thus forming discrete cavities arranged in an annular manner around a circumference.

In some embodiments a stator vane 125 may be positioned axially aft of the blade 104. At least a portion of the nesting cavity 119 may be disposed radially outward of the vane 125. The axially aftmost extent of the nesting cavity 119 may be positioned axially forward of the trailing edge of the vane 125. The mouth of the nesting cavity 119 may be entirely positioned axially forward of the vane 125.

In some embodiments the containment assembly 100 further comprises an intermediate casing 131, which may be referred to as a cassette liner or an intermediate casing member. The intermediate casing 131 may be positioned between the liner 117 and the outer casing 108. The intermediate casing 131 may be disposed radially outward of at least a portion of the liner 117. The intermediate casing 131 may at least partially define the nesting cavity 119. The nesting cavity 119 may be bounded at least in part by the intermediate casing 131 and the outer casing 108. In some embodiments the nesting cavity 119 is fully bounded by the intermediate casing 131 and outer casing 108. The intermediate casing 131 may extend between the forward fence 111 and the aft fence 113, and may at least partly bound the liner 117. The intermediate casing 131 may comprise aluminum, titanium, steel, and/or composite. The intermediate casing 131 may also comprise an aramid (such as Kevlar) or a similar material such as PBO (Zylon).

In some embodiments the intermediate casing 131 may be coupled to the outer casing 108. In some embodiments a portion of the intermediate casing 131 is coupled to a portion of the outer casing 108. As shown in subsequent figures, options for coupling the intermediate casing 131 include bonding, bolting, or using similar means of attachment. In the embodiment of FIGS. 1 and 2, the intermediate casing 131 is bonded to the outer casing 108. The outer casing 108 may be disposed radially outward of at least a portion of the intermediate casing 131.

The intermediate casing 131 may diverge from the outer casing 108 at a bond point 132. Positioning the bond point 132 relatively more axially forward may result in improved blade capture, while positioning the bond point 132 relatively more axially aft may result in improved dynamic stability of the containment assembly 100 and fan 102. In some embodiments the bond point 132 is positioned axially between the leading edge 120 and trailing edge 121 of blade 104. In some embodiments the bond point 132 is positioned axially proximate the trailing edge 121. In some embodiments the bond point 132 is positioned axially between the trailing edge 121 and aft fence 113. In some embodiments the bond point 132 is axially aligned with the trailing edge 121.

In some embodiments the containment assembly 100 further comprises a nesting member 134. The nesting member 134 may be positioned in and may substantially fill the nesting cavity 119. The nesting member 134 may comprise a solid or honeycomb structure. The nesting member 134 may comprise one or more of nomex or metal honeycomb, foam, and/or aerogel. The nesting member 134 may comprise a material or combination of materials having a low density. For example, in some embodiments, nesting member 134 may comprise a low density aluminum honeycomb material.

In some embodiments a radially outermost extent of the nesting cavity 119 is radially outward of a radially outermost extent of the liner 117.

In some embodiments the nesting cavity 119 may extend axially forward of the blade 104. In some embodiments the nesting cavity 119 may extend axially forward and axially aft of the forward fence 111. In some embodiments the nesting cavity 119 may be partially or entirely disposed forward of forward fence 111 or leading edge 120.

During operation, the disclosed containment assembly 100 only moderately increases the nacelle radius as compared to previous containment systems, thus minimizing any drag penalty incurred by the assembly 100. The disclosed containment assembly 100 additionally results in less weight dedicated to containment, thus improving aircraft range.

In the event of a FBO event, the impact of a detached blade against liner 117 will remove energy from the detached blade. However, the detached blade will pass through the liner 117 and intermediate casing 131 to enter nesting cavity 119. The detached blade will be captured in the nesting cavity 119. In certain FBO events, the detached blade may impact the forward fence 111 and be prevented from further axially forward motion.

As the captured blade is not ejected in a forward or radially outward direction, the disclosed containment assembly 100 meets FBO requirements imposed by regulations. Also, since the captured blade does not pass downstream upon detaching from fan 102, the disclosed containment assembly 100 reduces subsequent damage to downstream components. This reduction in collateral damage results in reduced unbalanced loads on the engine and therefore improves engine stability and integrity during rundown and fly home stages of a flight.

In some embodiments the intermediate casing 131 may be bolted to the outer casing 108. FIGS. 3-7 illustrate examples of embodiments having an intermediate casing 131 bolted to the outer casing 108.

Figure 3:
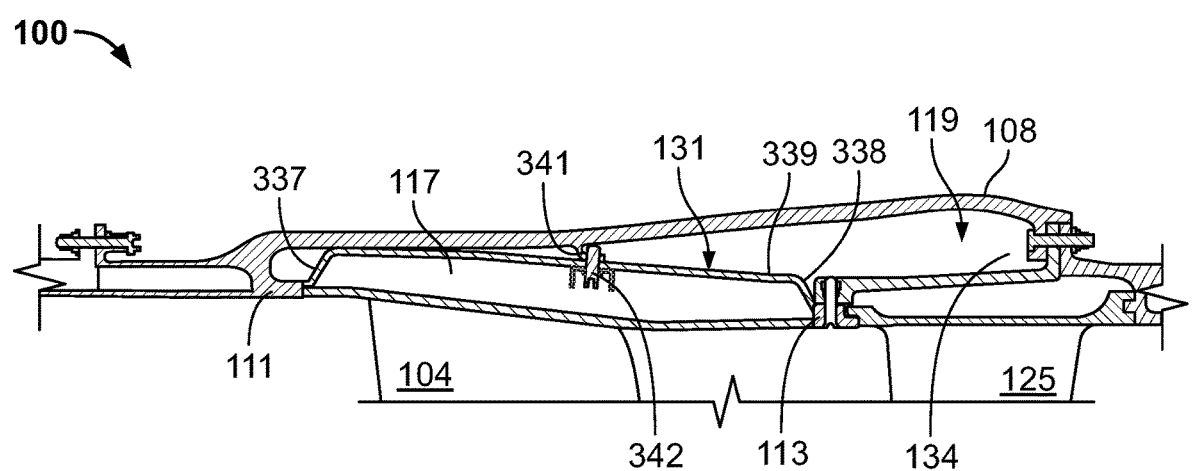
FIG. 3 is an axial cutaway view of a fan and containment assembly of a gas turbine engine in accordance with some embodiments of the present disclosure.

In the embodiment of FIG. 3, the intermediate casing 131 extends between the forward fence 111 and aft fence 113. The intermediate casing 131 may comprise a forward end 337 coupled to the forward fence 111, an aft end 338 coupled to the aft fence 113, and a substantially linear member 339 extending between the forward end 337 and aft end 338.

The outer casing 108 comprises an attachment flange 341 that extends radially inward from the outer casing 108. A bolt 342 or similar attachment mechanism couples the intermediate casing 131 to the outer casing 108, and more specifically to the flange 341. The bolt 342 passes through the intermediate casing 131 and flange 341. The bolt 342 may comprise a bolt head, washer, nut, or similar structures to couple the intermediate casing 131 to the flange 341.

The flange 341 may be positioned axially forward of trailing edge 121, as shown in FIG. 3. However, in other embodiments the flange 341 may be positioned axially aft of the trailing edge 121 or may be axially aligned with the trailing edge 121. A liner 117 may be disposed radially inward from the intermediate casing 131.

Figure 4:
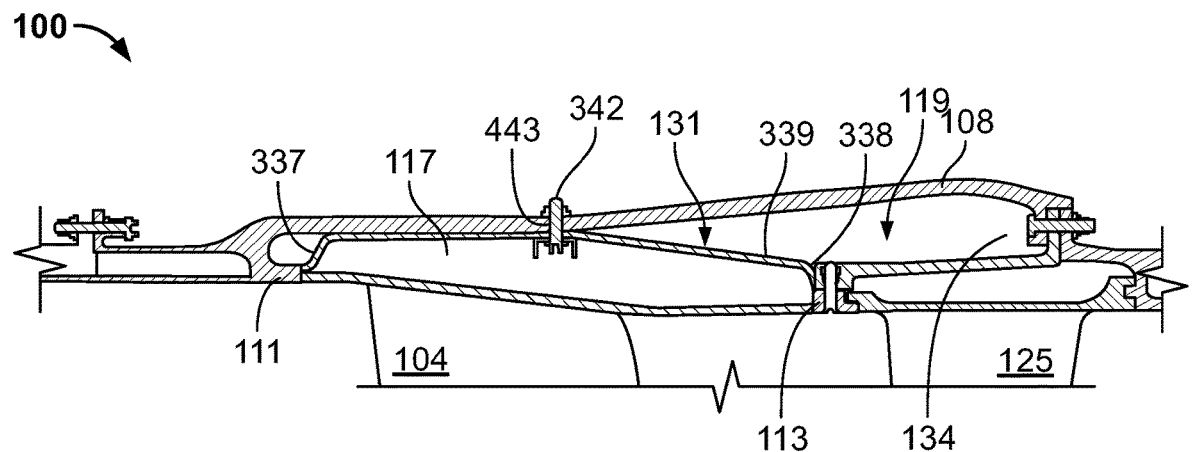
FIG. 4 is an axial cutaway view of a fan and containment assembly of a gas turbine engine in accordance with some embodiments of the present disclosure.

In the embodiment of FIG. 4, the intermediate casing 131 is bolted directly to the outer casing 108, without a flange 341. The intermediate casing 131 may extend radially away from the blade 104 as it extends aft from the forward end 337 until approximately an axial midpoint of the intermediate casing 131, and may then extend radially inward as it extends aft from the approximate midpoint to the aft fence 113. The outer casing 108 may comprise an aperture 443 for receiving a bolt 342. The aperture 443 may be positioned axially forward of trailing edge 121, as shown in FIG. 4. However, in other embodiments the aperture 443 may be positioned axially aft of the trailing edge 121 or may be axially aligned with the trailing edge 121.

A bolt 342 or similar attachment mechanism couples the intermediate casing 131 to the outer casing 108. The bolt 342 passes through the intermediate casing 131 and aperture 443. The bolt 342 may comprise a bolt head, washer, nut, or similar structures to couple the intermediate casing 131 to the aperture 443.

Figure 5:
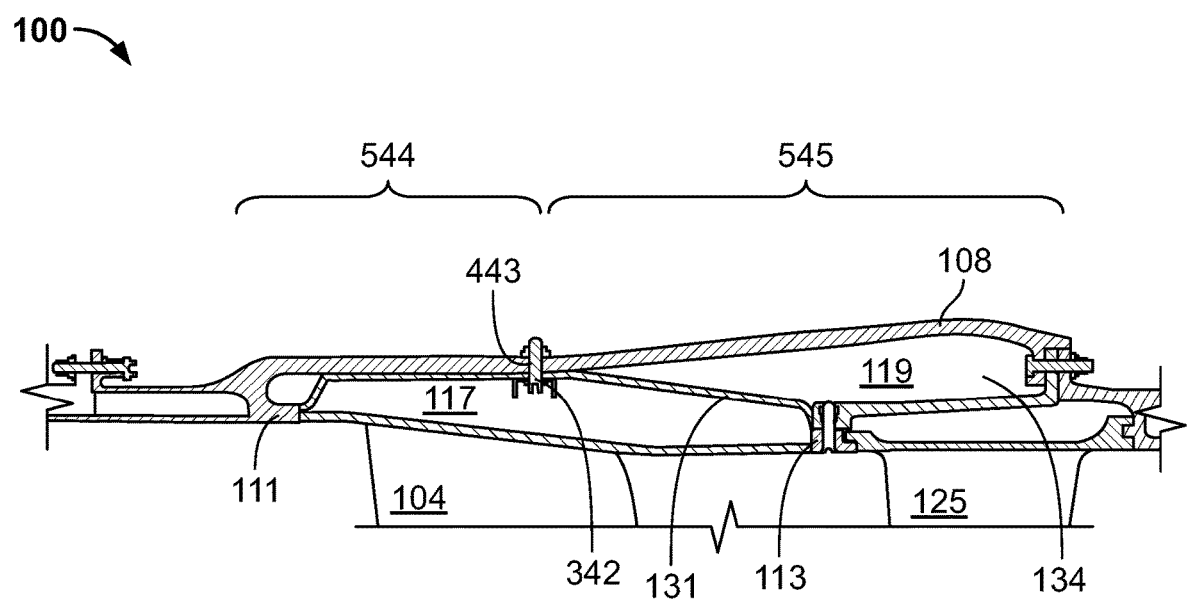
FIG. 5 is an axial cutaway view of a fan and containment assembly of a gas turbine engine in accordance with some embodiments of the present disclosure.

In some embodiments outer casing 108 may comprise a forward portion 544 and an aft portion 545. FIG. 5 illustrates an example of an embodiment having an outer casing 108 that comprises a forward portion 544 and an aft portion 545. The forward portion 544 may extend parallel to the axis of rotation, such that the portion of liner 117 bound by the forward portion 544 may have an annular radially outer surface. In some embodiments the portion of the liner 117 bound by the forward portion 544 may be cylindrical.

Aft portion 545 may extend radially outward as it extends aft from the forward portion 544. An aperture 443 may be positioned in the forward portion 544 as shown in FIG. 5, or at the transition between the forward portion 544 and aft portion 545. In other embodiments the aperture 443 may be positioned in the aft portion 545. As described above with reference to FIG. 4, a bolt 342 may couple the intermediate casing 131 to the outer casing 108 via the aperture 443.

Figure 6:
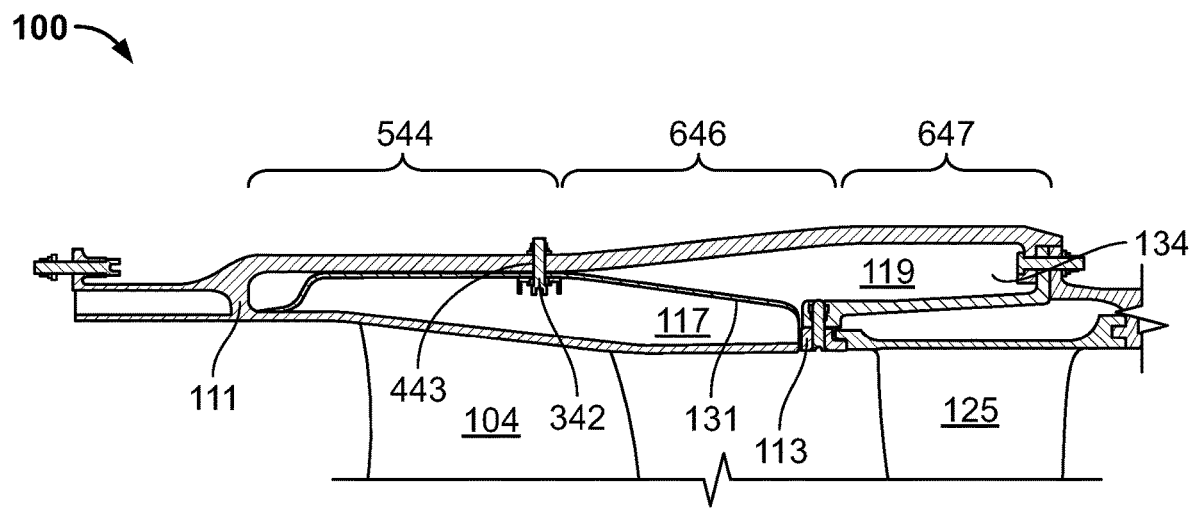
FIG. 6 is an axial cutaway view of a fan and containment assembly of a gas turbine engine in accordance with some embodiments of the present disclosure.
Figure 7:
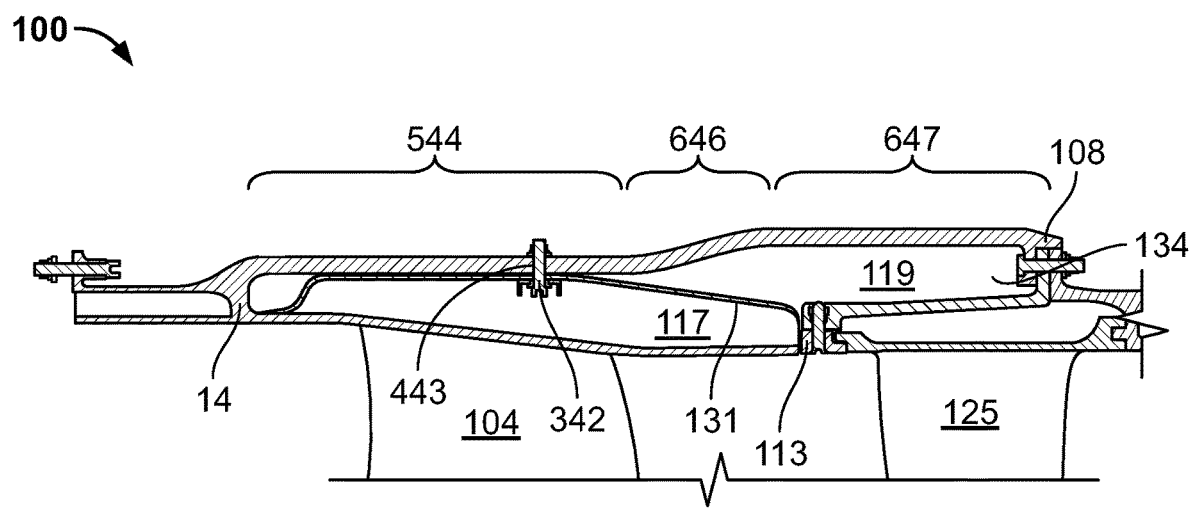
FIG. 7 is an axial cutaway view of a fan and containment assembly of a gas turbine engine in accordance with some embodiments of the present disclosure.

In some embodiments outer casing 108 may comprise a forward portion 544, a mid portion 646, and an aft portion 647. FIGS. 6 and 7 illustrate an examples of embodiments having an outer casing comprising a forward portion 544, a mid portion 646, and an aft portion 647. The forward portion 544 may extend parallel to the axis of rotation, such that the portion of liner 117 bound by the forward portion 544 may have an annular radially outer surface. In some embodiments the portion of the liner 117 bound by the forward portion 544 may be cylindrical. Similarly, the aft portion 647 may extend parallel to the axis of rotation, such that the portion of nesting cavity 119 bound by the aft portion 647 may have an annular radially outer surface. In some embodiments the portion of the nesting cavity 119 bound by the aft portion 647 may be cylindrical. Mid portion 646 may extend radially outward as it extends between the forward portion 544 and aft portion 647.

An aperture 443 may be positioned in the forward portion 544 as shown in FIGS. 6 and 7, or at the transition between the forward portion 544 and mid portion 646. In other embodiments the aperture 443 may be positioned in the aft portion 647. As described above with reference to FIG. 4, a bolt 342 may couple the intermediate casing 131 to the outer casing 108 via the aperture 443.

By varying the axial length of forward portion 544 and aft portion 647, the axial length and pitch of the mid portion 646 may be modified. For example, in FIG. 6 the mid portion 646 has a greater axial length and less steep pitch (i.e. angle relative to the axis of rotation) as compared to the mid portion 646 of FIG. 7.

Figure 8:
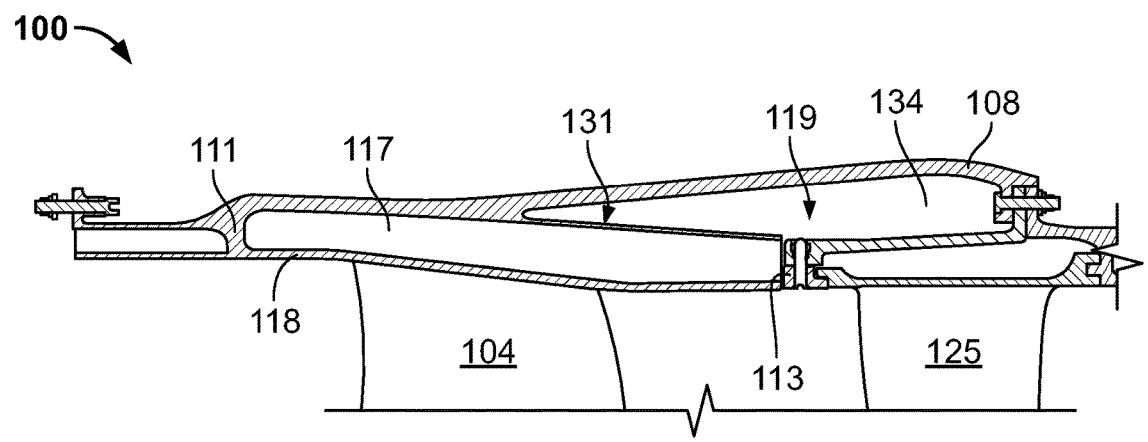
FIG. 8 is an axial cutaway view of a fan and containment assembly of a gas turbine engine in accordance with some embodiments of the present disclosure.

In still further embodiments the intermediate casing 131 may be integrally formed with the outer casing 108. FIG. 8 illustrates an example of an embodiment with an intermediate casing 131 integrally formed with the outer casing 108. The intermediate casing 131 may extend from the outer casing 108 as a ligament from a separation point 848. In some embodiments, the intermediate casing 131 may extend radially inward as it extends axially aft from the separation point. In some embodiments the outer casing 108 may extend radially outward as it extending axially aft from the separation point 848.

Separation point 848 may be positioned axially forward of the trailing edge 121 as shown in FIG. 8. In other embodiments, the separation point 848 may be axially aligned with the trailing edge 121 or may be positioned axially aft of the trailing edge 121.

Figure 9:
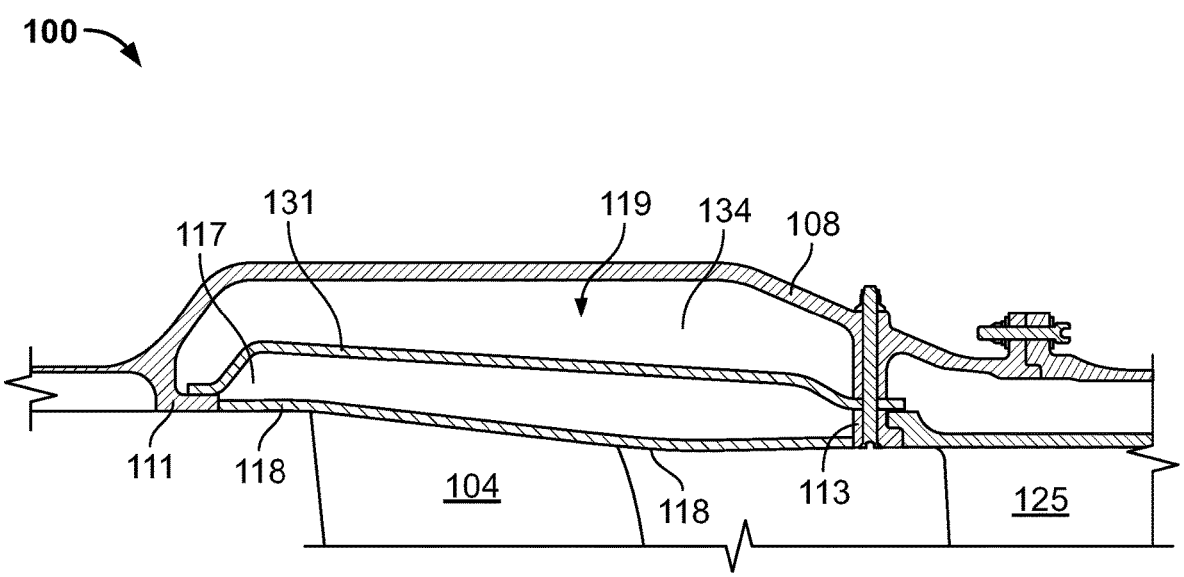
FIG. 9 is an axial cutaway view of a fan and containment assembly of a gas turbine engine in accordance with some embodiments of the present disclosure.

FIG. 9 illustrates an embodiment of the present disclosure in which the nesting cavity 119 is positioned between the forward fence 111 and aft fence 113. The containment assembly 100 of FIG. 9 comprises a liner 117, nesting cavity 119, and outer casing 108. The outer casing 108 defines a forward fence 111 and aft fence 113. Both the liner 117 and nesting cavity 119 are disposed between the forward fence 111 and aft fence 113. An intermediate casing 131 may extend between the forward fence 111 and aft fence 113 and separate the liner 117 from the nesting cavity 119. A nesting member 134 may be disposed in the nesting cavity 119. The intermediate casing 131 may have a uniform radial dimension through the length of the intermediate casing 131.

In the embodiment of FIG. 9, the liner 117 forms a radially inner member of the containment assembly 100. The liner 117 may comprise an attrition liner 118. The intermediate casing 131 is disposed radially outward from the liner 117. The outer casing 108 is disposed radially outward and radially offset from the intermediate casing 131. The annular nesting cavity is disposed between and at least partly defined by the outer casing 108 and the intermediate casing 131. Each of the liner 117, intermediate casing 131, and nesting cavity 119 extend between the forward fence 111 and aft fence 113. In some embodiments, each of the liner 117, intermediate casing 131, and nesting cavity 119 extend axially forward of the leading edge 120 and axially aft of the trailing edge 121.

Figure 10:
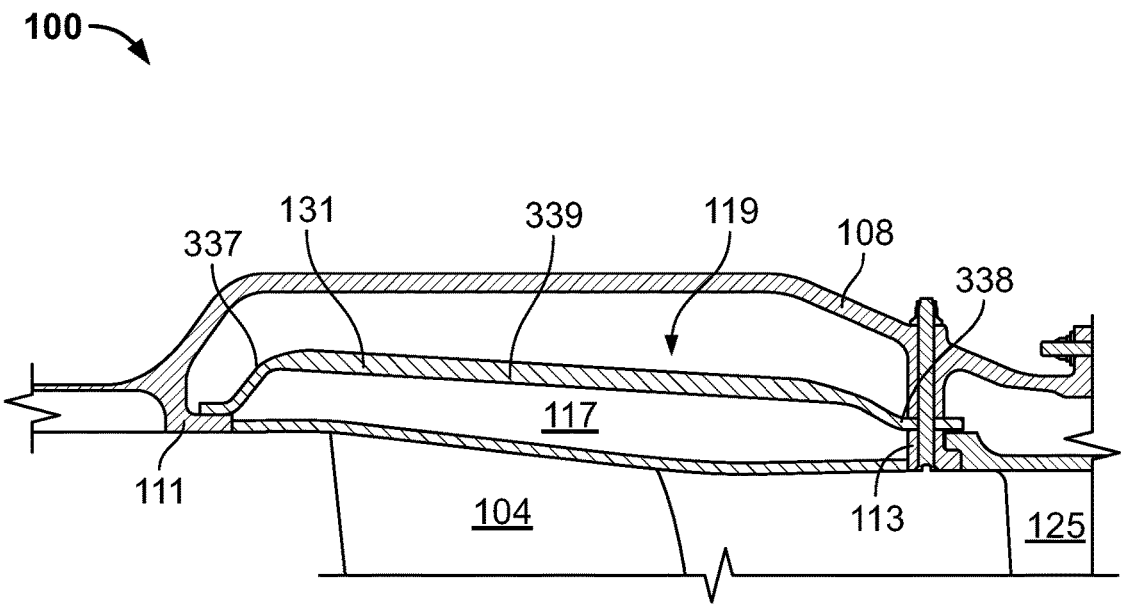
FIG. 10 is an axial cutaway view of a fan and containment assembly of a gas turbine engine in accordance with some embodiments.
Figure 11:
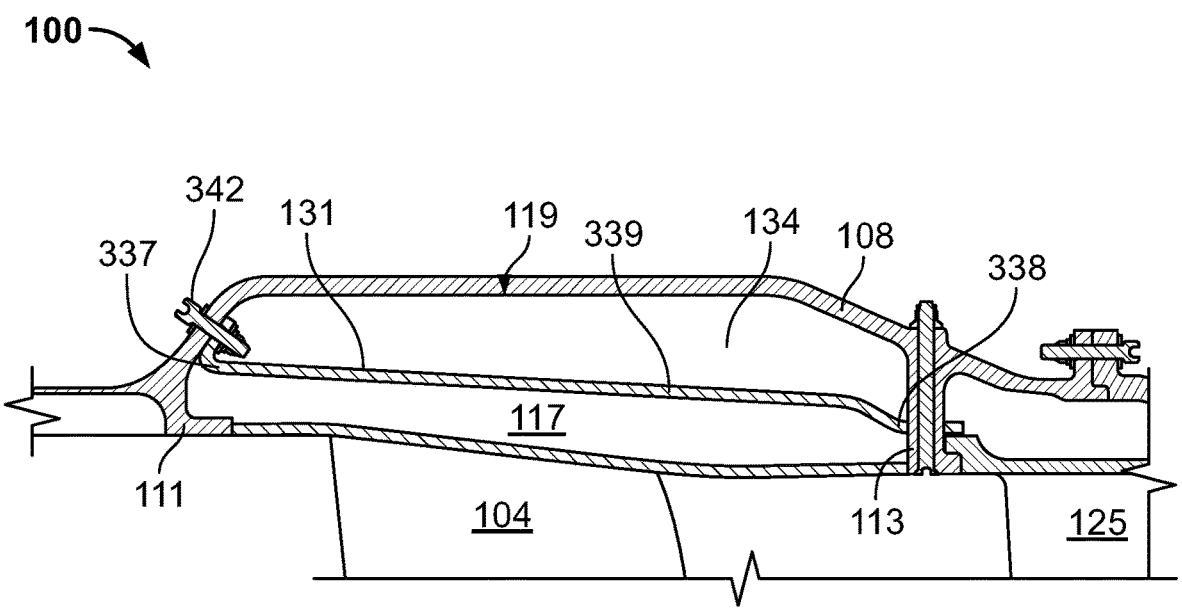
FIG. 11 is an axial cutaway view of a fan and containment assembly of a gas turbine engine in accordance with some embodiments of the present disclosure.

In some embodiments, the intermediate casing 131 may have a non-uniform radial dimension through the length of the intermediate casing 131, and/or having an increased thickness as compared to the intermediate casing 131 shown in FIG. 9. FIG. 10 illustrates such an embodiment. The intermediate casing 131 of FIG. 10 comprises a forward end 337 coupled to the forward fence 111, an aft end 338 coupled to the aft fence 113, and a central member 339 extending between the forward end 337 and aft end 338. The forward end 337 and aft end 338 may have a first thickness, and the central member 339 may have a second thickness that is different from the first thickness. In some embodiments, the second thickness is greater than the first thickness. The intermediate casing 131 therefore has a non-uniform radial dimension through its length.

In some embodiments with a nesting cavity 119 extending between the forward fence 111 and aft fence 113, the intermediate casing 131 may be bolted to the outer casing 108. FIG. 10 illustrates an embodiment of a containment assembly 100 having an intermediate casing 131 bolted to the outer casing 108. In this embodiment, the intermediate casing 131 may comprise a forward end 337 that extends radially outward and defines an aperture for receiving a bolt 342. The outer casing 108 may define an aperture that corresponds to the aperture of the forward end 337. A bolt 342 may pass through each aperture and couple the intermediate casing 131 to the outer casing 108.

Figure 12:
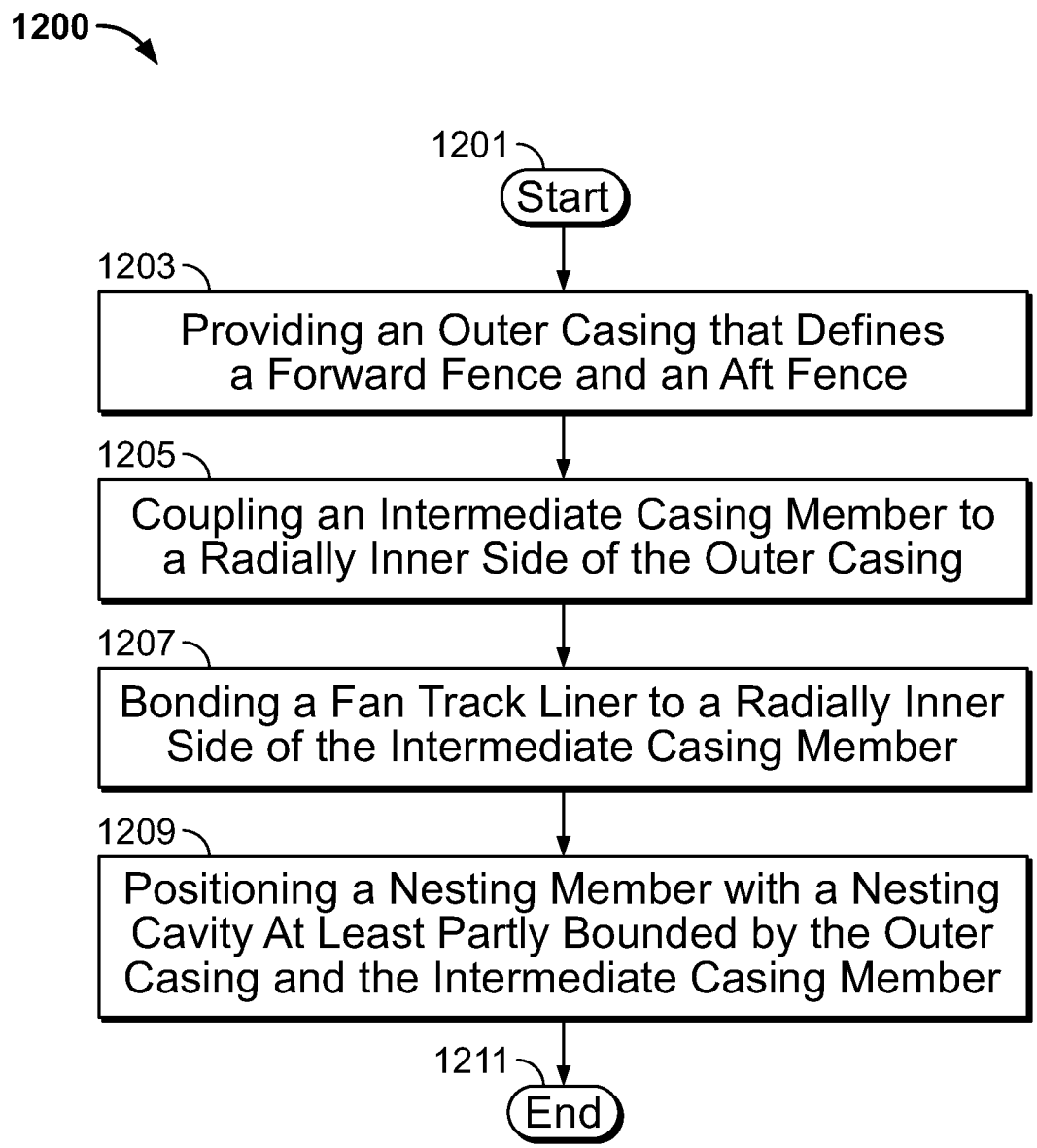
FIG. 12 is a flowchart of a method in accordance with some embodiments of the present disclosure.

The present disclosure additionally provides methods of making, implementing, and operating a fan containment assembly 100. FIG. 12 is a flowchart of a method 1200 of making a fan containment 100 in accordance with some embodiments of the present disclosure.

Method 1200 starts at Block 1201. At Block 1203, an outer casing 108 is provided. The outer casing 108 defines a forward fence 111 and an aft fence 113. At Block 1205, an intermediate casing 131 is coupled to a radially inner side of the outer casing 108. At Block 1207 a fan track liner 117 is bonded to a radially inner side of the intermediate casing 131. At Block 1209 a nesting member 134 is positioned within a nesting cavity 119. The nesting cavity 119 is at least partly bounded by the outer casing 108 and the intermediate casing 131. Method 1200 ends at Block 1211.

Although examples are illustrated and described herein, embodiments are nevertheless not limited to the details shown, since various modifications and structural changes may be made therein by those of ordinary skill within the scope and range of equivalents of the claims.

What is claimed is:

1. A containment assembly for a turbofan engine comprising:
   a forward fence;
   an aft fence axially spaced from said forward fence;
   a fan track liner disposed axially between said forward and aft fences;
   an intermediate casing member disposed radially outward of at least a portion of said fan track liner;
   an outer casing member disposed radially outward of at least a portion of said intermediate casing member, wherein a radially outermost point of the outer casing member at an axial location of the aft fence is radially farther away from a rotor of the turbofan engine than a radially outermost point of the outer casing member at an axial location of the forward fence; and
   an annular nesting cavity bounded at least in part by said intermediate casing member and said outer casing member, wherein a first portion of the annular nesting cavity, at the axial location of the aft fence, is disposed radially outward of a radially outermost point of the aft fence and at least a portion of the intermediate casing member, and wherein a second portion of the annular nesting cavity extends axially aft of the intermediate casing member and the aft fence.

2. The containment assembly of claim 1 further comprising a nesting member disposed in the annular nesting cavity.

3. The containment assembly of claim 2 wherein the nesting member comprises a honeycomb material.

4. The containment assembly of claim 1 wherein the intermediate casing member comprises composite and is coupled to the outer casing member.

5. The containment assembly of claim 1 wherein said outer casing member defines the forward fence and wherein said annular nesting cavity extends axially forward and axially aft of said forward fence.

6. The containment assembly of claim 1 wherein the fan track liner comprises an annular attrition liner.

7. A machine having a bladed rotor defining an axis of rotation, the bladed rotor radially bound at least in part by a containment assembly, the containment assembly comprising:
   a casing defining a forward fence positioned axially forward of the bladed rotor and an aft fence positioned axially aft of the bladed rotor, wherein a radially outermost point of the casing at an axial location of the aft fence is radially farther away from the bladed rotor than a radially outermost point of the casing at an axial location of the forward fence;
   an annular liner disposed radially outward of the bladed rotor and extending between the forward fence and the aft fence; and
   an annular blade nesting cavity defined at least in part by said casing and positioned radially outward of at least a portion of said annular liner, said annular blade nesting cavity extending axially forward and axially aft of said aft fence, and wherein the annular blade nesting cavity, at the axial location of the aft fence, is disposed radially outward of a radially outermost point of the aft fence.

8. The containment assembly of claim 7 further comprising an intermediate casing member disposed between the casing and the annular liner.

9. The containment assembly of claim 8 wherein the intermediate casing member is coupled to the casing.

10. The containment assembly of claim 9 wherein the intermediate casing member is bolted to the casing, having a bolt axially positioned between a leading edge and a trailing edge of a blade of the bladed rotor.

11. The containment assembly of claim 7 wherein at least a portion of the annular liner or the annular blade nesting cavity is cylindrical.

12. The containment assembly of claim 7 wherein a radially outermost point of the annular blade nesting cavity is radially outward of a radially outermost point of the annular liner.

13. The containment assembly of claim 7 wherein said forward fence comprises a hook.

14. The containment assembly of claim 7 wherein said annular blade nesting cavity extends axially forward and axially aft of said forward fence.

15. A machine having a plurality of blades affixed to a rotor, each blade having a leading edge, a trailing edge, and a blade tip, wherein the rotor defines an axis of rotation of the machine and is radially bounded at least in part by a containment assembly, the containment assembly comprising:
   a forward fence;
   an aft fence axially spaced from said forward fence;
   a fan track liner forming a radially inner member of said containment assembly, wherein the fan track liner extends between the forward fence and the aft fence;
   an intermediate casing member disposed radially outward of the fan track liner;
   an outer casing member disposed radially outward and radially offset from the intermediate casing member, wherein a radially outermost point of the outer casing member at an axial location of the aft fence is radially farther away from the rotor than a radially outermost the outer casing member at an axial location of the forward fence; and
   an annular nesting cavity disposed between and at least partly defined by the outer casing member and the intermediate casing member, wherein a first portion of the annular nesting cavity, at the axial location of the aft fence, is disposed radially outward of a radially outermost point of the aft fence and at least a portion of the intermediate casing member, and wherein a second portion of the annular nesting cavity extends axially aft of the intermediate casing member and the aft fence; wherein each of the fan track liner, the intermediate casing member, and the annular nesting cavity extend axially forward of the leading edge of a blade and axially aft of the trailing edge of a blade.

16. The containment assembly of claim 15 further comprising a nesting member disposed in the annular nesting cavity.

17. The containment assembly of claim 16 wherein the nesting member comprises a honeycomb material.

18. The containment assembly of claim 15 wherein the intermediate casing member comprises composite.

19. The containment assembly of claim 15, wherein the blades include a blade, wherein the outer casing member defines a forward fence positioned axially forward of the leading edge of the blade and an aft fence positioned axially aft of the trailing edge of the blade, and wherein each of the fan track liner, the intermediate casing member, and the annular nesting cavity extend between the forward fence and the aft fence.

20. The containment assembly of claim 15 wherein the forward fence comprises a hook.

* * * * *